United States Patent [19]

Berlinghoff et al.

[11] Patent Number: 5,433,613
[45] Date of Patent: Jul. 18, 1995

[54] TRAINING AND PRACTICE APPARATUS FOR SIMULATING AND PRACTISING CLINICAL DENTAL PROCESSES AND FOR CARRYING OUT TECHNICAL DENTAL WORK

[75] Inventors: Frank Berlinghoff, Herlazhofen; Helmut Klamer, Leutkirch, both of Germany

[73] Assignee: Kaltenbach & Voigt GmbH & Co., Biberach/Riss, Germany

[21] Appl. No.: 129,146

[22] PCT Filed: Jan. 21, 1993

[86] PCT No.: PCT/EP93/00134

§ 371 Date: Oct. 7, 1993

§ 102(e) Date: Oct. 7, 1993

[87] PCT Pub. No.: WO93/16458

PCT Pub. Date: Aug. 19, 1993

[30] Foreign Application Priority Data

Feb. 11, 1992 [DE] Germany .......... 42 03 958.4

[51] Int. Cl.[6] .......... G09B 23/28
[52] U.S. Cl. .......... 434/263; 433/77
[58] Field of Search .......... 434/263, 262; 433/77

[56] References Cited

U.S. PATENT DOCUMENTS

| 3,943,629 | 3/1976 | Ueno et al. .......... 434/263 |
| 5,013,240 | 5/1991 | Bailey et al. .......... 433/77 |
| 5,158,488 | 10/1992 | Berlinghoff et al. .......... 434/262 |

FOREIGN PATENT DOCUMENTS

| 3127614 | 1/1983 | Germany .......... 434/263 |
| 3941332 | 6/1991 | Germany . |
| 404060684 | 2/1992 | Japan .......... 434/263 |

Primary Examiner—John G. Weiss
Attorney, Agent, or Firm—Fitzpatrick, Cella, Harper & Scinto

[57] ABSTRACT

In a training and practice apparatus (1) for simulating and practicing clinical dental processes and for carrying out technical dental work, with a liquid extraction device (17) and a solids extraction device (14), a common vacuum source (25) is provided for both extraction devices (14, 17), with a suction line section (26) which branches at a branch (27) with two suction line branches (28, 29) to the extraction devices (14, 17), a change-over device (37) being arranged in the area of the branch (27) to open the one suction line branch and simultaneously close the other suction line branch (28, 29).

18 Claims, 6 Drawing Sheets

TRAINING AND PRACTICE APPARATUS FOR SIMULATING AND PRACTISING CLINICAL DENTAL PROCESSES AND FOR CARRYING OUT TECHNICAL DENTAL WORK

BACKGROUND OF THE INVENTION

1. Field of the Invention

The invention relates to a training and practice apparatus for simulating and practising clinical dental processes and for carrying out technical dental work.

2. Description of the Related Art

An apparatus of this kind is disclosed in DE 39 41 332 A1. It is a combined training and practice apparatus comprising a stationary dental-technical training and practice apparatus and a movable dental treatment training and practice apparatus, the latter being designed in the shape of a box and, when not in use, being capable of being pushed under the one half of the table-like stationary dental treatment training and practice apparatus in such a way that in the region of the other half, there is still working space for technical dental work on this training and practice apparatus. In order also to carry out cutting or machining work, an extraction hood is arranged in the region of the free half of this apparatus so as to prevent dust from getting into the environment when such work is being carried out.

The movable dental treatment training and practice apparatus is provided with a model head and/or bust on which the clinical dental processes can be undertaken, the model bust being capable of being swivelled up and back into several working positions which correspond to the required treatment positions, from a swivelled-down parking position into which it can be pushed under the technical dental training and practice apparatus. In order to be able to work also with water cooling and water cleaning of the area subject to treatment, a spray mist extraction device with a suction pipe which can be inserted in the mouth of the model head is associated with the dental treatment training and practice apparatus.

Although DE 39 41 332 A1 discloses that an extraction connection of an extraction unit for liquid and/or dust can be associated with the apparatus it is not disclosed whether the extraction connection is used for the connection of the disclosed spray mist extraction and extraction hood for solids extraction or whether the extraction connection serves as a further possibility for the extraction of liquid and/or dust.

The object of the invention is to enable simple operation of a training and practice apparatus of the kind described above whilst ensuring little outlay in terms of construction and manufacture and low power consumption.

The training and practice apparatus according to the invention has only one suction source, the suction line of which is branched and forms a liquid suction device and a solids suction device. A change-over device for opening the one suction line branch and closing the other one is associated with the suction line branches preferably in the area of the branch. This design of the training and practice apparatus which is simple and inexpensive to manufacture fully meets the requirements of the training and practice apparatus because only the liquid suction device is required for dental treatment work and only the solids suction device for dental-technical work, and the suction device can be changed over for the required function when the work to be done changes. This not only reduces the outlay on the training and practice apparatus but also the size because only one suction source is required.

More specific features of the invention lead to a practical and expedient arrangement of the associated filter device, assure a simple and easily handled change-over and lead to a further simplification of the training and practice apparatus whilst assuring economical manufacture.

BRIEF DESCRIPTION OF THE DRAWINGS

The invention and further advantages which can be achieved by it will be described in greater detail below with reference to preferred embodiments and the drawings, in which.

DETAILED DESCRIPTION OF THE PREFERRED EMBODIMENTS

Figure 1:
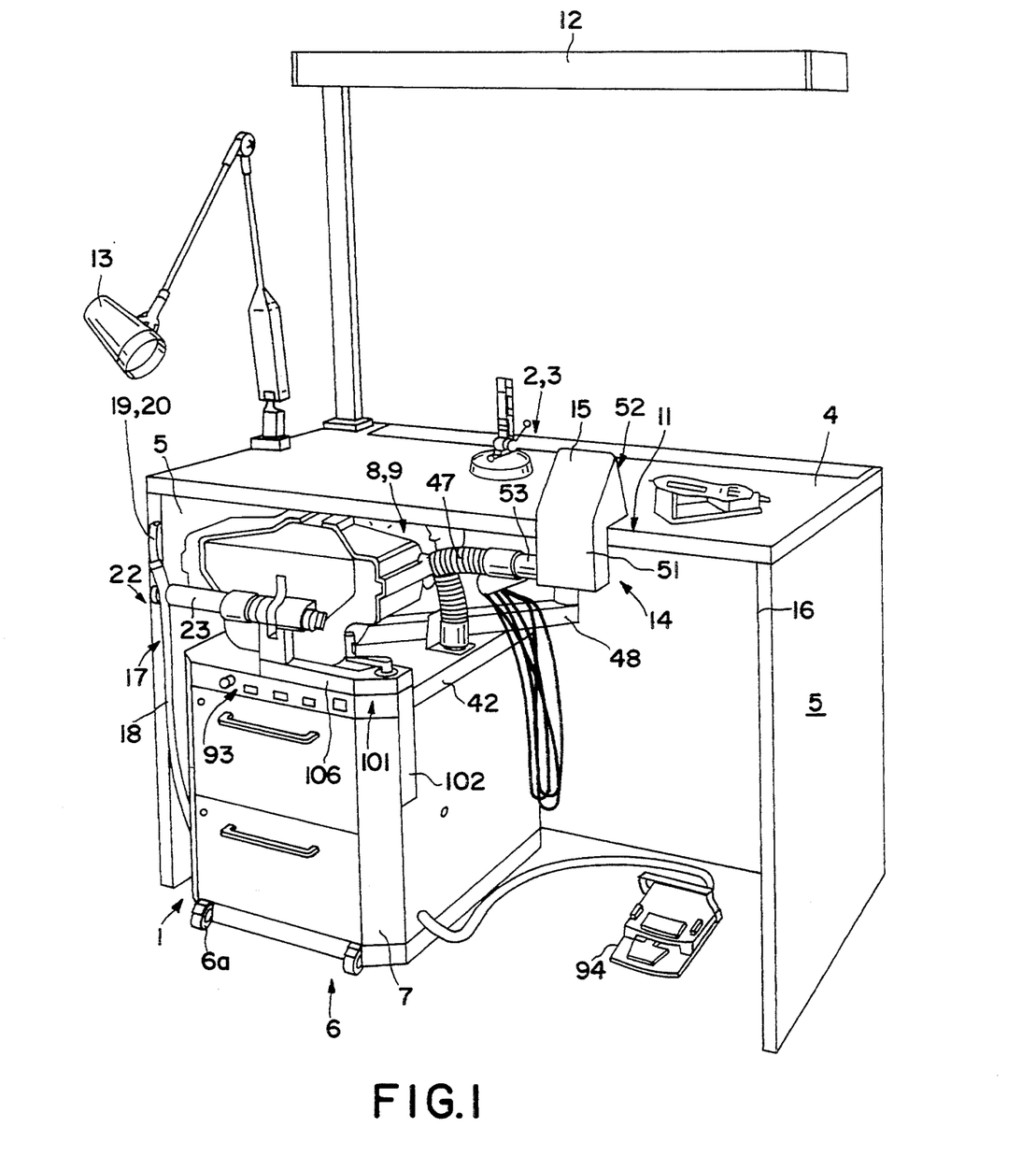
FIG. 1 shows a perspective view of a training and practice apparatus combining a stationary dental-technical training and practice apparatus and a movable dental treatment training and practice apparatus.

The combined training and practice apparatus 1 comprises the stationary dental-technical training and practice apparatus 2 in the form of a workbench 3 with a horizontal work surface 4 and four feet or two lateral vertical base panels 5 and the movable dental treatment training and practice apparatus 6 which has a cabinet-type base 7 to which a model head 8 and preferably a model bust 9 is mounted, partially concealed, capable of being swivelled in and out in a vertical plane and of being fixed in desired swivel positions. In terms of width the dental treatment apparatus 6 mounted on rollers 6a is only approximately half the size of the dental-technical apparatus 2 and when it is not in use it can be pushed into a parking position under the work surface 4 in the area of one half side thereof so that the other half side is available as a technical dental work station 11.

The workbench 3 equipped with a fixed and a movable lamp 12, 13 can be equipped with at least one powered dental-technical tool for carrying out technical dental work, which is not shown for reasons of simplicity. A dust extraction device 14, preferably in the form of an extraction hood 15, associated with the dental-technical apparatus 2, is mounted in the central area of the work station 11 on the front side 16 of the bench 3, particularly on the work surface 4, or on the dental treatment apparatus 6 and is also supplied with suction air from this apparatus 6.

Figure 2:
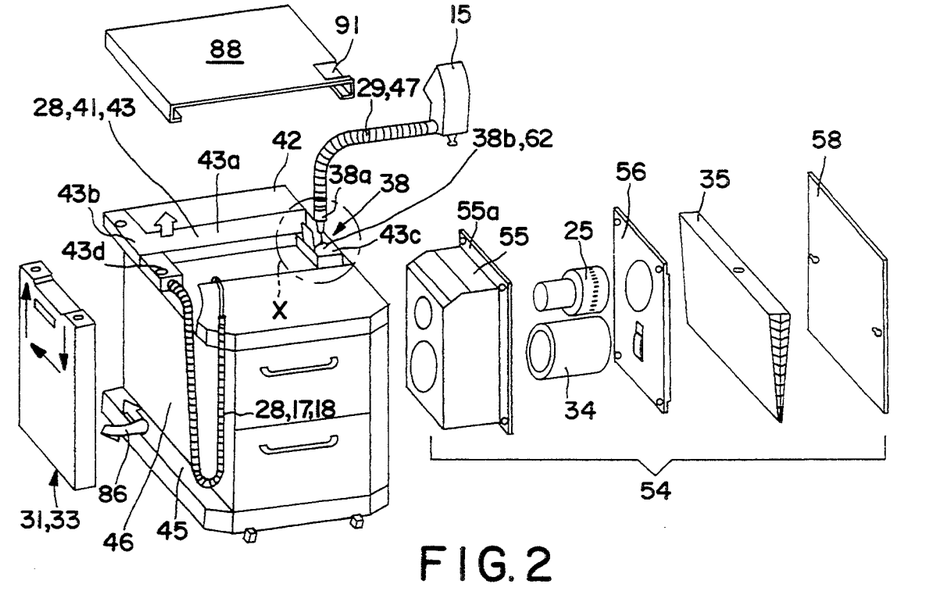
FIG. 2 shows a perspective view of the dental treatment training and practice apparatus with an extraction unit and a water separator device.

Associated with the dental treatment apparatus 6 is a liquid or spray extraction device 17 comprising a flexible hose 18 and a suction pipe 19 arranged at its free end, which is inserted into the mouth of the model head 8 for suction purposes. A mounting device 22 for the spray aspirator 20 when it is not in use is provided on the dental treatment apparatus 6. In this embodiment the spray aspirator 20 can be suspended on one end of the swivel shaft 23 mounting the model bust 9 on a bearing column.

Figure 3:
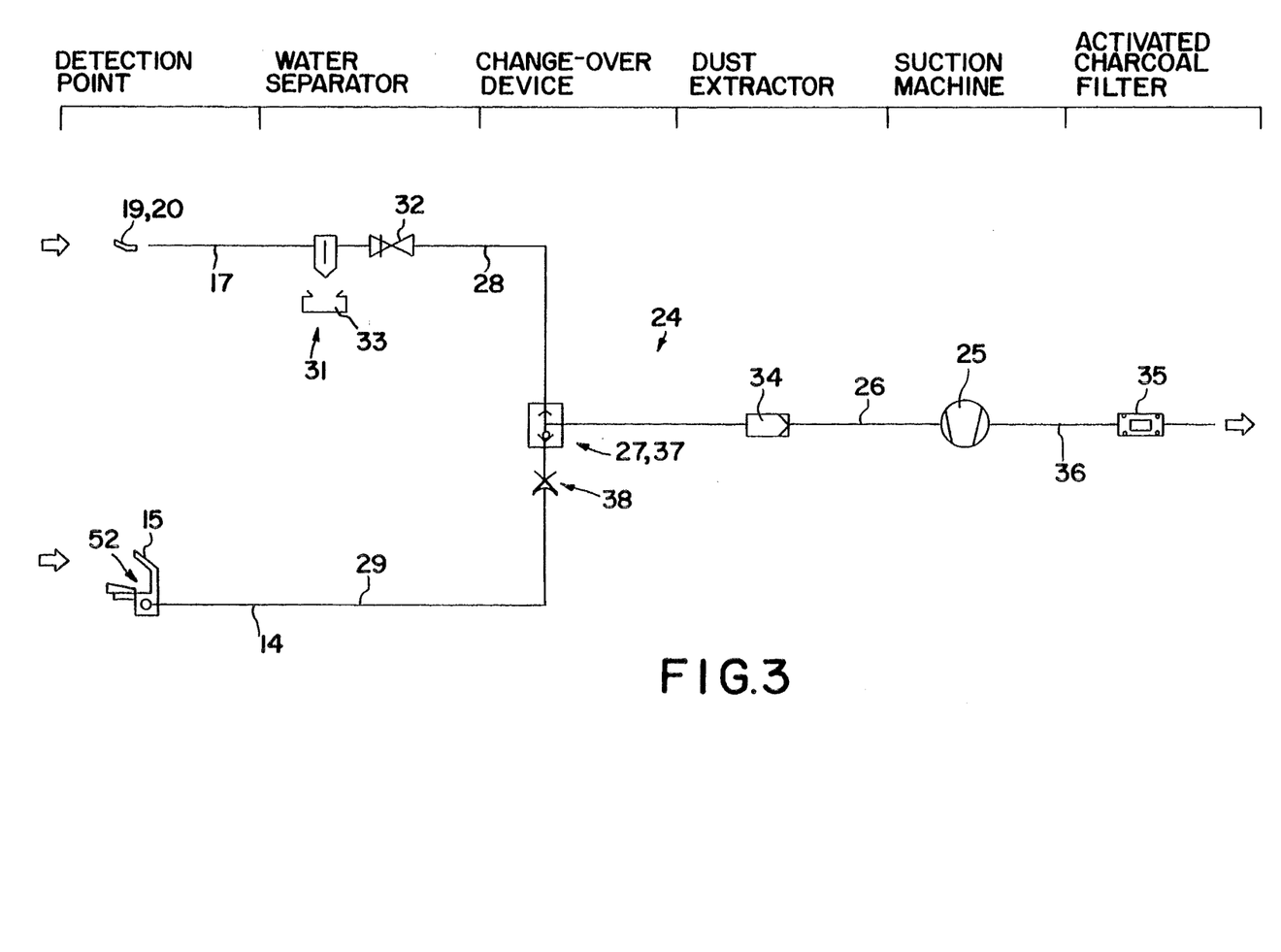
FIG. 3 shows a schematic view of the extraction unit.

The dust and spray extraction devices 14, 17 are parts of a common extraction unit 24 associated with the dental treatment apparatus 6, which according to FIGS. 2 and 3 comprises a suction machine 25, from which a common suction line section 26 leads, which branches at a branch 27 into a spray suction line section 28 and a dust extraction section 29, the former extending to the spray aspirator 20 whilst the latter extends to the extraction hood 15.

Connected to the spray suction line section 28 is a water separator 31 with a float 32 which preferably emits a signal electrically and/or switches off the suction machine 25 when the water in a collecting tank 33 of the water separator 31 exceeds a specified level. 34 denotes a dust extractor which is arranged in the common suction line section 26. The reference number 35 denotes a filter, in particular an activated charcoal filter, which is arranged in the exhaust air line 36 leading from the suction machine 25. In the branch 27 a change-over device 37 for the suction air is provided in which one of the two extraction lines 28, 29 is connected to the suction machine 25 in each case whilst the other extraction line section is blocked. The reference number 38 denotes a plug-in coupling for and/or in the dust extraction line section 29 which makes it possible to remove the latter when the dust extraction device 14 is not in use and to connect it again when it is in use. Preferably the arrangement is made in such a way that when the connector 38a is inserted in the plug-in coupling 38b the change-over device 37 is changed over in such a way that the dust extraction line section 29 is opened and the spray extraction section 28 closed.

Figure 4:
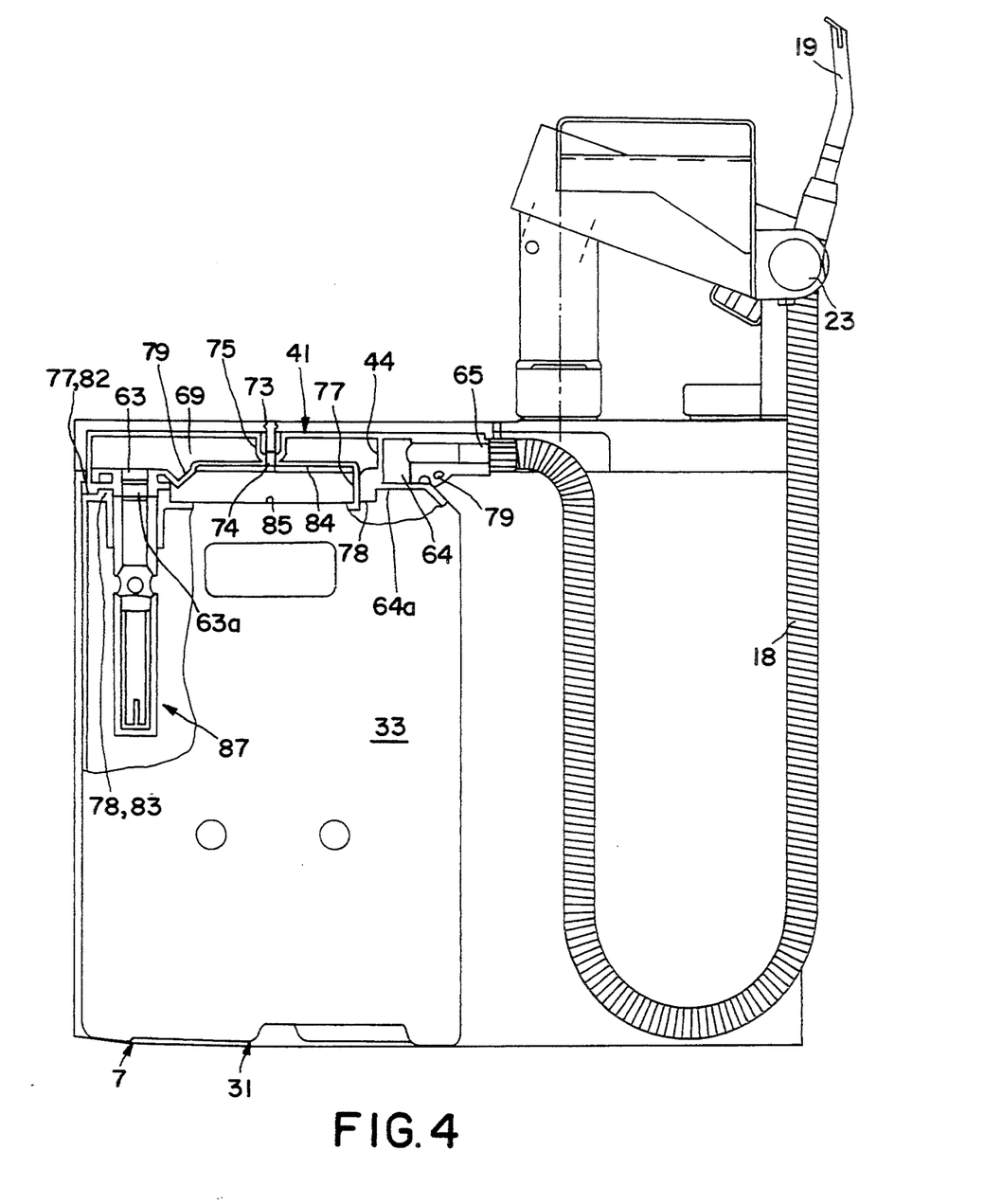
FIG. 4 shows a partly sectional side view from the left of the training and practice apparatus according to FIG. 2.

As can be seen from FIG. 2 in particular, the suction machine 25 is arranged on one side of the cabinet-like base 7, on the right-hand side in this case, and the water separator 31 is arranged on the other side of the base 7, both above-mentioned parts being carried by the base 7 and being connected together by means of a suction line part 41. In this embodiment the suction line part 41 is formed by a suction line pipe 43 arranged on a cover wall 42 of the base 7, which has a flat, preferably rectangular cross-sectional shape and can be L-shaped when viewed from the top and thus comprises a suction line pipe section 43a extending transversely to the base 7 and a suction line pipe section 43b extending in the longitudinal direction of the base from its one end, the left-hand end in this case. The suction line pipe section 43b preferably extends towards the back. A further suction line pipe section 43c, which preferably extends towards the front for structural reasons in this embodiment, so that the suction line pipe 43 is Z-shaped when viewed from the top, can be arranged laterally at the free end of the suction line pipe section 43a. Opposite the suction line pipe section 43b there extends from the suction line pipe section 43a towards the front a further suction line pipe section 43d corresponding to the cross-sectional shape so that this produces a suction pipe body that is T-shaped when viewed from the top, which preferably consists of plastic. Whilst the hollow space of the suction line pipe section 43c is connected to the hollow spaces of the suction line pipe sections 43a and 43b, the hollow space of the suction line pipe section 43d is separated from the hollow space of the L and/or Z-shaped suction line pipe 43 by means of a partition 44 (FIG. 4). The suction line pipe sections 43b, 43d are in a position projecting laterally from the base 7. A laterally projecting carrying limb 45 which extends horizontally is provided in the lower area of the base 7. The water separator 31 is arranged in a water collecting tank 33 which is sufficiently slim in design and sufficiently high to fit between the carrying limb 45 and the suction line pipe sections 43b, 43c, it being capable of being supported laterally by the adjacent side wall 46 of the base 7.

The extraction hood 15 which can be optionally connected to the extraction unit 24 in a way still to be described is mounted in an associated bearing at the extreme end of a horizontal swivel arm 48 (FIG. 1) preferably so that it can swivel about a vertical swivel axis, the inner end of the swivel arm 48 being connected to the base 7 by means of a joint with a vertical swivel axis. The joint is on the top of the base 7, preferably in a central position. The extraction hood 15 is formed by an angular housing 51 with a front suction opening 52 on the horizontal leg of the angular shape, whilst a connecting sleeve 53 which is connected to the suction line part 41 by means of a flexible suction hose 47 is arranged in the lower part of the vertical housing limb on the side facing the dental treatment apparatus 6.

The flow paths extending through the suction line part 41 between the suction machine 25 and the spray aspirator 20 and the extraction hood 15 are described below.

As FIG. 2 clearly shows, a suction unit 54 is arranged in a box-shaped suction unit housing 55, to which a lateral free space (not shown) of corresponding size is allocated in the base 7, so that the suction unit 54 can be inserted and fixed in the base 7 in the manner of a suction cartridge, a flange 55a on the housing 55 and fixing screws passing through the flange being usable for this fixing. The suction machine 25, the dust extractor 34, the filter 35, in particular charcoal filter for HG and MMA (mercury and methylmethacrylate vapours), preferably in the form of a slim filter cartridge arranged on edge, a vertical wall 56 as a cover and an outer cover plate 58 are arranged in the suction unit 54.

Figure 5:
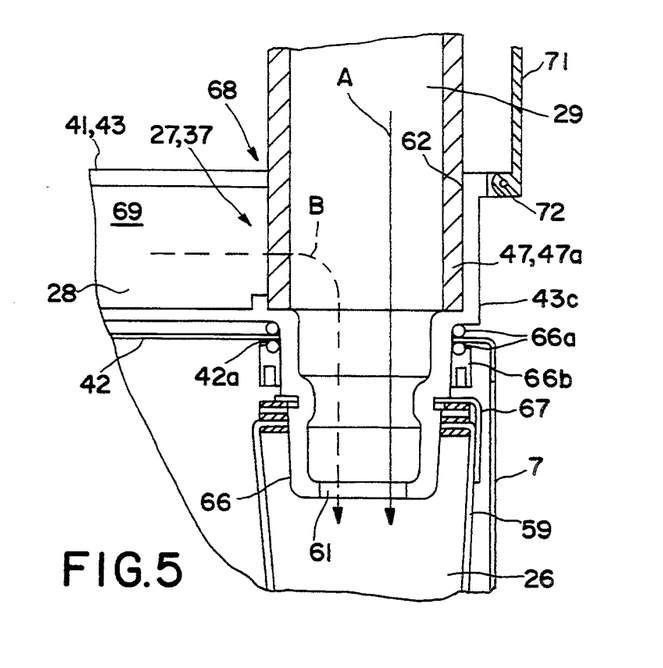
FIG. 5 shows an enlarged vertical section of the detail marked x in FIG. 2.

The suction line part 41 has five connection openings 61 to 65 to connect the suction line part 41 to the suction unit 54 by means of a flexible suction hose 59 shown only in FIG. 5, to the flexible suction hose 47 of the extraction hood 15, to the liquid collecting tank 33 and the flexible hose 18 of the suction pipe 19. The first connection opening 61 is arranged on the underside of the right-hand end area of the suction line pipe section 43a or on the underside of the suction line pipe section 43c and it is preferably formed by a connecting sleeve 66 projecting downwards (FIG. 5) which penetrates the cover wall 42 of the cabinet-like base 7 downwards in a hole 42a, the suction hose 59 being connected to the connecting sleeve 66 by means of a plug-in connection 67, a clamp connection or a bayonet fixing.

The second connection opening 62 is on the upper side of the right-hand end area of the suction line part 41, preferably opposite the connecting sleeve 66. It is preferably formed by a plug-in connection 68 or plug-in socket into which the associated end of the flexible suction hose 47 can be inserted with a corresponding end piece 47a if necessary, the flexible hose 47 passing through the hollow space 69 forming the one suction line section of the suction line part 41 in such a way that it is only connected to the first connection opening 61 and/or the connecting sleeve 66 in the inserted position and seals the hollow space 69 so that in the inserted position there is a flow passage A only between the flexible hose 47 and the connecting sleeve 66 and/or the suction hose 59. When the suction hose 47 is removed from the plug-in socket 68, however, the passage B from the hollow space 69 to the suction hose 59 is open, a sealing flap 71 on the suction line part 41 being swivel-mounted in a joint 72 to seal the second connection opening 62; in its folded-down sealing position it closes and seals off the second connection opening 62.

The third and fourth connection openings 63 and 64 to connect to the collecting tank 33 are each provided on the underside in the area of the suction line pipe sections 43b, 43d (FIG. 4) and they are aligned with connection openings 63a, 64a arranged on the top of the collecting tank 33. Sealing the suction line part 41 and the collecting tank 33 with respect to each other in the region of the edges of the above-mentioned pairs of connection openings can be ensured in a simple manner by application of pressure, preferably acting on the suction air part 41 and elastically pre-loading the latter against the top of the collecting tank 33. Furthermore the installation and removal of the collecting tank 33 can be facilitated and improved by the end of the preferably rigid suction line part 41 facing the collecting tank 33 being arranged flexibly in the vertical direction. To do this, the suction line part 41 is preferably mounted slightly flexibly and/or tiltably at its end facing away from the collecting tank 33 so that its end facing the collecting tank 33 can be slightly raised and/or tilted and is stressed downwards by the above-mentioned spring force. In this embodiment this initial pre-loading is formed by a compression spring 73 which rests, supported above, on a vertical bolt 74 and presses with its lower end against the suction air part 41 and stresses it flexibly downwards. Preferably the through-hole for the bolt 74 is in a taper 75 or material accumulation sealing the associated top wall and bottom wall of the suction air part 41 together so that the bolt 74 does not pass through the hollow space 69 of the suction line part 41 and there are no sealing problems.

It is also advantageous to provide a positive connection between the suction air part 41 and the collecting tank 33 in their fitting position which prevents a horizontal displacement of the collecting tank 33 and hence an unintentional breaking of the connection. Such a positive connection can be formed by stop parts 77, 78, opposite one another with respect to the connection opening(s) 63, 64 and/or 63a, 64a or surrounding the latter, which centre the collecting tank 33 in the fitting position in preferably two directions at right angles to one another. In this embodiment, on one side of the connecting holes in each case are notches 79, arranged on the underside of the suction line part 41 in this case and preferably with inclined butting faces on both sides, which permit the suction line part 41 to be pressed over through horizontal displacement of the collecting tank 33. This greatly simplifies the installation of the collecting tank 33 because it can be brought into its fitting position by horizontal displacement, the suction line part 41 displacing upwards and latching into the fitting position and positively securing the collecting tank. In this embodiment the connection openings 63a, 64a are each arranged in a downwardly or upwardly directed projection of the suction line part 41 or collecting tank 33 so that upper-side and underside recesses 84, 85 are present on the underside of the suction line part 41 and on the top of the collecting tank 33 between the projections 82, 83. This embodiment makes it possible to insert the collecting tank 33 in a position, between the suction line part 41 and the bearing limb 45, which is laterally offset with respect to its fitting position, preferably until it is against the side wall 46 (see movement-indicating arrow 86) and then to push it in the longitudinal direction, along the side wall 46 in this case, into its fitting position. The removal of the collecting tank takes place in the reverse direction.

The specified displacement of the suction line part 41 upwards when the collecting tank 33 is inserted can take place on the basis of elastic flexibility or preferably by mounting at its other end area such that it can be swivelled upwards and/or tilted. In this embodiment the connection sleeve 6 which is preferably moulded on in a single piece is held in the hole 42 so that it can tilt. For this purpose, rings 66a of flexible material, which are slightly compressed by a nut 66b screwed onto the connection sleeve 66, can be arranged on and/or under the hole edge.

The fifth connection opening 65 for the flexible hose 18 of the spray extractor 17 can also be arranged on the underside of the suction line pipe section 43c and in this embodiment it is arranged on the forwards-facing front side of the suction line pipe section 43d. The flexible hose 18 is detachably connected to this connection opening 65 preferably by means of a socket or plug-in socket.

When the suction hose 47 is removed from the plug-in socket 67 and the suction machine 25 is switched on, the suction air flows from the spray aspirator 20 (with water or spray) into the suction line pipe section 43d, through the front pair of connection openings 64, 64a into the collecting tank 33, through a vertical water separator pipe 87, which extends from the connection opening 63a into the collecting tank 33, into the suction air pipe 43 and through the suction hose 59 and via the suction machine 25 to the discharge pipe 36.

A horizontal cover plate 88, which can be placed onto the base 7 or the suction line part 41 and is retained by means of suitable fixing means, is provided to cover the extraction unit 24 described above. In the area of the second fixing opening 62 a hole 91 which permits the connection of the suction hose is provided in the cover plate 88.

The mounting of the collecting tank 33 described above permits easy installation and removal, e.g. for emptying purposes. Furthermore, on the basis of the lateral flush-fitting of the collecting tank 33, the apparatus 6 can be small in size and the collecting tank 33 can have a large volume because it can extend over the entire lateral surface of the base 7. It is advantageous to arrange the stop parts 77, 78 in such a way that incorrect installation of the collecting tank 33 is positively prevented. It is also advantageous to associate with the collecting tank 33 a safety device, represented only in FIG. 3 by means of the float 32, which switches off the suction machine 25 by means of the float 32 itself and a switch which is not shown, on the basis of a rise in level and/or supplies a visual, acoustic or electrical display when the collecting tank 33 is full. It is also advantageous to provide a further safety device with a contact switch and a contact element (not shown) which is acted on by the collecting tank 33 in its installation position and which also supplies a visual, acoustic or electrical display when the collecting tank 33 is not installed or is incorrectly installed, and preferably prevents the suction machine 25 from working.

The electrical control device which is present is also preferably integrated in particular in the upper area of the base 7. Actuation elements 93 for electrical control are provided on the front of the base 7, or cabinet, preferably on its cover wall 42. A foot switch 94 is also provided, e.g. to switch on working tools which can be pneumatically or electrically driven and are not shown, which are associated with the technical dental apparatus 2 or for switching on dental treatment instruments.

Figure 6:
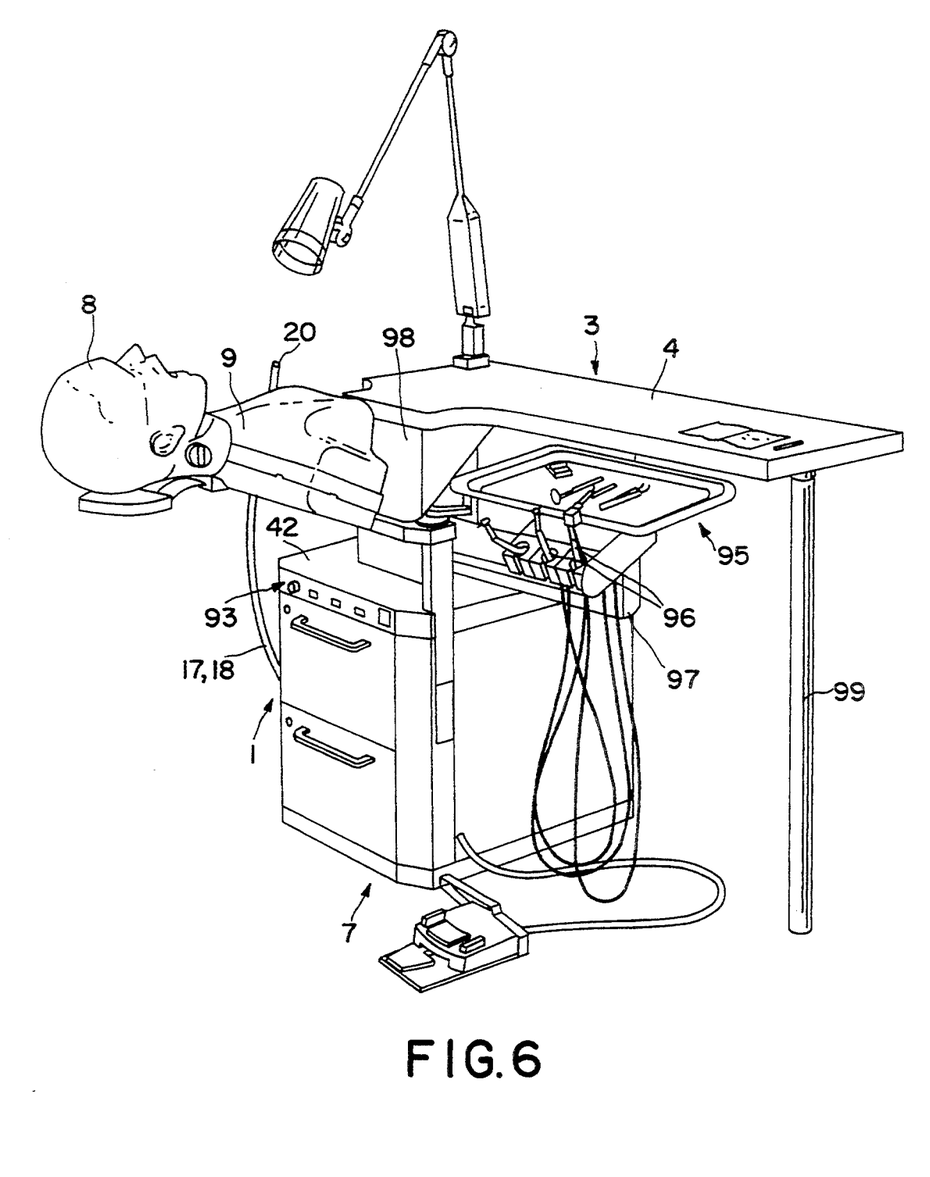
FIG. 6 shows a perspective view of a stationary dental treatment training and practice apparatus as a single unit.

The training and practice apparatus 1 according to FIG. 6, in which identical or comparable parts are provided with the same reference numbers, differs from the above-described embodiments in that it does not comprise two separate, combinable pieces of apparatus 2, 6 but is formed as a preferably fixed unit. In FIG. 6 a mounting unit 95, also present in the embodiment according to FIG. 1, for dental treatment instruments 96 connected to supply hoses is provided, which can be preferably horizontally pivot-mounted on a horizontal swivel arm 97 and has a tablet-shaped bearing surface for treatment tools on the top. The horizontal swivel arm 97 can be designed and mounted similarly to the horizontal swivel arm 48 described above. The mounting unit 95 can be present in addition to or instead of a dust extraction unit 14 as described above with extraction hood 15 carried by the swivel arm 48. In FIG. 1 the mounting unit 95 is swivelled into a rear parking position under the workbench work surface 4 as it is not required. In such a case the horizontal swivel arms 48, 97 can be swivelled over one another.

In the training and practice apparatus according to FIG. 6 a workbench work surface 4 is provided which is supported at its end which faces the dental treatment apparatus 6 on the base 7 thereof, e.g. by means of a bearing column or console 98. The other end of the workbench work surface 4 is supported on the ground by means of a preferably column-shaped bench leg 99. In this embodiment the workbench work surface 4 can be recessed at the front in the area of the mounting unit 95 so that this produces an angular shape for the workbench work surface 4.

A further alternative embodiment of a training and practice apparatus 1 will be described below with the aid of FIG. 7 in which identical or comparable parts are also provided with the same reference numbers. This variant applies to all the embodiments described above.

In order to be able to adapt the model head 8 and/or the model bust 9 to working positions at different heights, the carrier 101 for the model head 8 or the model bust 9 is mounted so as to be vertically adjustable and fixable to the dental apparatus 6 in the adopted height setting. For this purpose there is a vertical bearing column 102, preferably square in cross-section, which is mounted on and/or in a vertical guide 103 of the base 7 so as to be vertically displaceable and is secured so that it cannot rotate. In this embodiment a vertical guide recess with a cross-sectional shape and size corresponding to the bearing column 102, in which the bearing column 102 is mounted so as to be vertically displaceable, is provided in the base 7, preferably in the front side, particularly corner area of one side, in this case the right-hand side. For vertical displacement purposes there is a vertical threaded spindle 104 rotatably mounted in the bearing column 102 which projects through the upper closed end of the bearing column 102 in a hole and is or can be connected to a crank 104a at this end so that it rotates with the crank. In the hollow bearing column 102 or underneath it is arranged a spindle nut 105 fixed to the base 7, into which the threaded spindle 104 is screwed. The threaded spindle 104 is rotatably mounted in the bearing column 102 but unmovably in its longitudinal direction, so that by screwing in or unscrewing the threaded spindle 104 the bearing column is moved vertically with the threaded spindle 104 and can thus be adapted to the desired working height. As already described in the embodiment according to FIG. 1, here also the model head 8 or the model bust 9 can be swivelled up and down on the carrier 101 formed by a horizontal bearing arm 106 or a horizontal universal joint shaft preferably centrally on the front of the base 7 and can be fixed in the appropriate swivel or working position.

Figure 7:
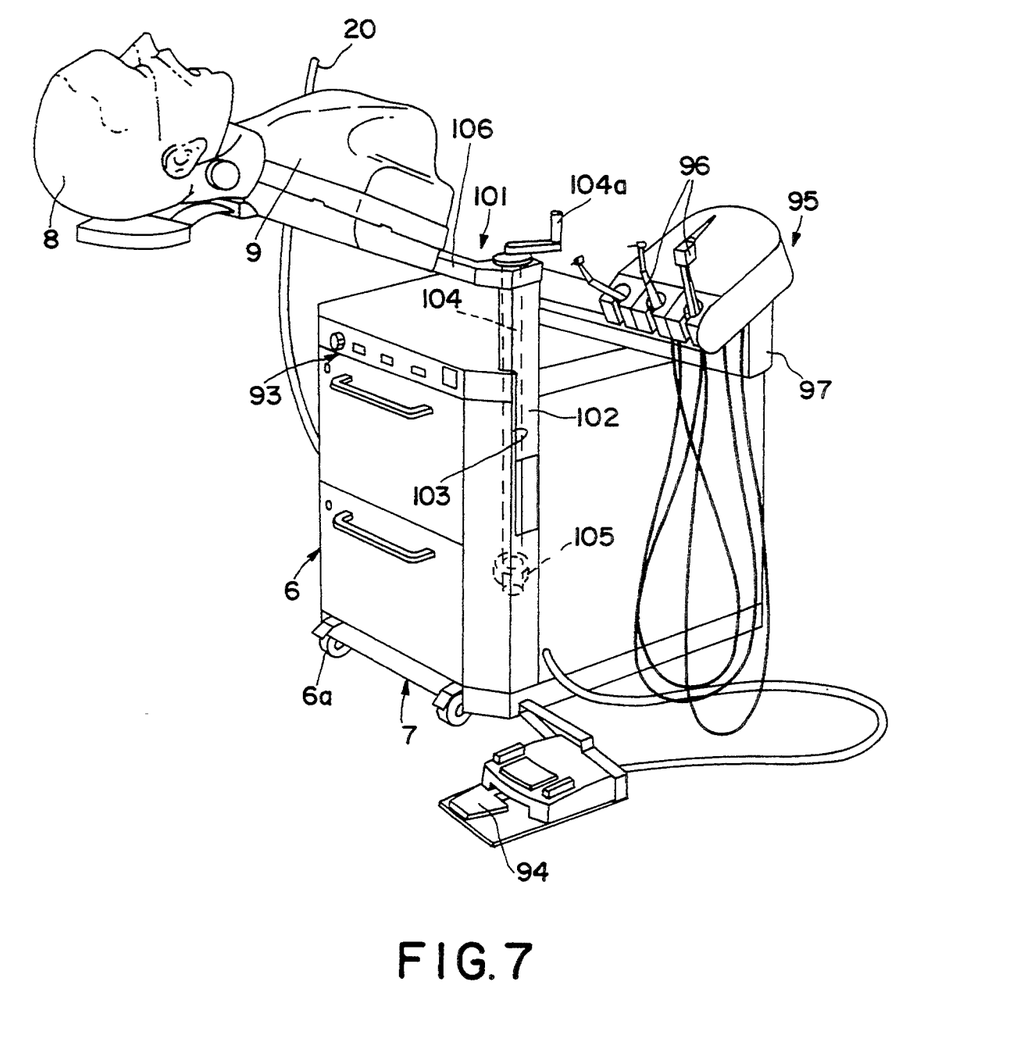
FIG. 7 shows a perspective view of a combined training and practice apparatus of modified configuration.

The dental treatment apparatus according to FIG. 7 can be an independent individual unit or an apparatus combined with the dental-technical apparatus 2.

We claim:

1. Training and practice apparatus for simulating and practising clinical dental processes and for carrying out technical dental work, comprising a liquid extraction device and a solids extraction device, there being provided for both extraction devices a common vacuum source with a common suction line section which branches at a branch with two extraction line sections to the liquid extraction device and to the solids extraction device, respectively, and a change-over device for opening one of said extraction line sections and simultaneously closing the other extraction line section, said change-over device being located in the region of said branch.

2. Training and practice apparatus according to claim 1, characterized in that said one of the two extraction line sections is connected to the solids extraction device and is detachably connected to said branch by means of a quick-action coupling.

3. Training and practice apparatus according to claim 2, characterized in that the quick-action coupling is formed by a plug-in coupling.

4. Training and practice apparatus according to claim 3, characterized in that the extraction line section which is connected to said solids extraction device has an insertable end which fits into an insertion opening in said branch and blocks the other extraction line section and becomes connected to the common suction line section, and in that a closure part is arranged to close the insertion opening when said insertion end is removed from the insertion opening.

5. Training and practice apparatus according to claim 4, wherein said closure part is formed by a flap cover.

6. Training and practice apparatus according to claim 2, characterized in that it further comprises a stationary dental-technical training and practice device and a movable dental treatment training and practice device, in that said solids extraction device is located on the dental-technical training and practice device and in that the liquid extraction device is located on the dental treatment training and practice device.

7. Training and practice apparatus according to claim 6, characterized in that the common vacuum source and the common suction line section are integrated in the dental-technical training and practice device.

8. Training and practice apparatus according to claim 1, characterized in that a water separator is arranged in the extraction line section associated with the liquid extraction device.

9. Training and practice apparatus according to claim 1, characterized in that a solids extractor is arranged in the common suction line section.

10. Training and practice apparatus according to claim 1, characterized in that the dental treatment training and practice apparatus comprises a model head with a model bust which is mounted on a base and is adjustable with respect to a working position, in that the common vacuum source is arranged on one side of the base and a water separator is arranged on the other side of the base and in that said water separator and said common vacuum source are connected together by means of a suction line part extending transversely across the base.

11. Training and practice apparatus according to claim 10, characterized in that the water separator is arranged in a collecting tank, in that the collecting tank is arranged under the suction line part and in that leak-proof connections are provided between the top of the collecting tank and said suction line part.

12. Training and practice apparatus according to claims 10, characterized in that the suction line part includes a first suction line pipe section which projects horizontally beyond said other side of the base, in that a second suction line pipe section is provided which also projects over the base on the same side and whose interior is separated from the interior of the first suction line pipe section, and in that the collecting tank is inserted between and separately connected to the first and the second suction line pipe sections and in that a carrying part on the base supports the collecting tank under the pipe sections to maintain a sealing action.

13. Training and practice apparatus according to claim 12, characterized in that the two suction line pipe sections are firmly interconnected parts of a rigid suction line pipe section which is mounted to be movable slightly in a vertical direction and is forced downwards against the collecting tank through the action of a spring.

14. Training and practice apparatus according to claim 13, characterized in that the collecting tank is configured such that it can be brought into or out of connection with the suction line pipe sections through horizontal movement and in that stops are provided to limit the horizontal movement of the collecting tank.

15. Training and practice apparatus according to claim 2, characterized in that the quick-action coupling for the extraction line section which is connected to the solids extraction device is arranged in the end area of the suction line section which is facing the vacuum source.

16. Training and practice apparatus according to claim 10, characterized in that the solids extraction device has an extraction hood having a housing which is mounted on a horizontal bearing arm which is pivot-mounted horizontally on the base.

17. Training and practice apparatus according to claim 1, characterized in that the liquid extraction device is a spray extraction device.

18. Training and practice apparatus according to claim 1, characterized in that the suction line branch of the liquid extraction device and the suction line branch of the solids extraction device are each formed by a flexible hose.

* * * * *